US010969786B1

(12) United States Patent
Viola et al.

(10) Patent No.: US 10,969,786 B1
(45) Date of Patent: Apr. 6, 2021

(54) DETERMINING AND USING RELATIVE MOTION OF SENSOR MODULES

(71) Applicant: Amazon Technologies, Inc., Seattle, WA (US)

(72) Inventors: Paul Viola, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/237,915

(22) Filed: Jan. 2, 2019

Related U.S. Application Data

(63) Continuation of application No. 15/381,867, filed on Dec. 16, 2016, now Pat. No. 10,209,713.

(51) Int. Cl.
*G05D 1/00* (2006.01)
*H04N 7/18* (2006.01)
*G06T 7/70* (2017.01)
*G06T 7/20* (2017.01)
*B64C 39/02* (2006.01)

(52) U.S. Cl.
CPC ......... *G05D 1/0094* (2013.01); *B64C 39/024* (2013.01); *G06T 7/20* (2013.01); *G06T 7/70* (2017.01); *H04N 7/183* (2013.01); *B64C 2201/141* (2013.01); *G06T 2207/10016* (2013.01)

(58) Field of Classification Search
CPC .......... G05D 1/0094; G06T 7/70; G06T 7/20; B64C 39/024; H04N 7/183

USPC .......................................................... 701/3
See application file for complete search history.

(56) References Cited

U.S. PATENT DOCUMENTS

| 2017/0030715 | A1* | 2/2017 | Song | .................. G01P 15/00 |
| 2018/0024570 | A1* | 1/2018 | Hutson | ............ G03B 15/006 |
| | | | | 701/4 |

OTHER PUBLICATIONS

Office Action for U.S. Appl. No. 15/381,867, dated May 3, 2018, Viola et al., "Determining and Using Relative Motion of Sensor Modules", 7 pages.

* cited by examiner

*Primary Examiner* — Yazan A Soofi
(74) *Attorney, Agent, or Firm* — Lee & Hayes, P.C.

(57) ABSTRACT

A system may include sensor modules configured to generate sensor signals representative of an environment surrounding a vehicle, and a sensor configured to be coupled to the frame of the vehicle at a location spaced from a first sensor module and configured to generate sensor signals representative of movement of the first sensor module relative to a portion of the frame. The system may also include a sensor processor configured to receive the sensor signals representative of movement of the first sensor module and estimate relative motion of the first sensor module relative to the portion of the frame of the vehicle. The sensor processor may also be configured to calculate, based at least in part on the relative motion estimation, a position, orientation, and/or velocity of the vehicle, and a position of objects in the surrounding environment and/or movement of the objects in the surrounding environment.

20 Claims, 6 Drawing Sheets

DETERMINING AND USING RELATIVE MOTION OF SENSOR MODULES

CROSS-REFERENCE TO RELATED APPLICATION

This application is a continuation and claims the benefit of priority based on U.S. application Ser. No. 15/381,867, filed Dec. 16, 2016, the entire disclosure of which is incorporated herein by reference.

BACKGROUND

Sensors may be used to detect or identify objects in an environment being monitored by the sensors. In many applications, the information determined based on sensor signals received from the sensors relies on knowledge of the locations of the sensors. However, in some situations the locations of the sensors may not be fixed, and movement of the sensors relative to other sensors of the system may impart inaccuracies in the information determined based on the sensor signals. As a result, the information determined based on some sensor systems may not be as accurate as desired for certain applications.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

This disclosure is generally directed to determining and using relative motion of sensors to improve the accuracy of information determined based on sensor signals received from the sensors. This concept may be applied to any sensor system including more than one sensor, where the information determined is based at least in part on the location of at least one of the sensors. As discussed above, sensors may be used to detect or identify objects in an environment being monitored by the sensors. In many applications, the information determined based on sensor signals received from the sensors may rely on knowledge of the location of at least one of the sensors. However, in some situations the locations and/or orientations of the sensors may not be fixed, and movement of the sensors relative to other sensors of the system may impart inaccuracies in the information determined based on the sensor signals. This disclosure is generally directed to determining and using the relative motion of sensors to improve the accuracy of the information determined based on sensor signals received from the sensors of the system.

For example, an autonomous vehicle, such as, for example, an unmanned aerial vehicle (UAV), may include a sensor system for flight control and navigation. The sensors of the system may be coupled to a frame of the vehicle and may generate sensor signals representative of the environment through which the vehicle travels. The control system of the vehicle may use the generated sensor signals to determine information about one or more of the location, orientation, and velocity of the vehicle, as well as the position and/or movement of objects in the environment surrounding the vehicle. In order to determine the information, the control system may use the locations of the sensors on the vehicle as a basis for estimating respective distances between the sensors and the sensed objects. However, vibrations and/or flexing of the vehicle frame may result in the locations of the sensors changing relative to one another and/or relative to a portion of the vehicle. This may impart inaccuracies in the information determined based on the sensor signals. One or more examples described in this disclosure may mitigate or eliminate such inaccuracies.

This disclosure is generally directed to a system, such as, for example, a system to control an autonomous vehicle such as a UAV. The system may include sensor modules configured to be coupled to a frame of the vehicle and generate sensor signals representative of an environment surrounding the vehicle. The sensor modules may include one or more sensors. The system may also include a sensor configured to be coupled to the frame of the vehicle at a location spaced from a first sensor module and configured to generate sensor signals representative of movement of the first sensor module relative to a portion of the frame of the vehicle. In some examples, the portion of the vehicle frame may be the portion of the frame on which the sensor is mounted. In some examples, the portion of the vehicle frame may correspond to the center of gravity of the vehicle. Other portions are contemplated.

The system may also include a sensor processor in communication with the sensor and the first sensor module. The sensor processor may be configured to receive the sensor signals representative of movement of the first sensor module from the sensor and estimate relative motion of the first sensor module relative to the portion of the frame of the vehicle. The sensor processor may also be configured to receive the sensor signals representative of the environment surrounding the vehicle from the sensor modules, and calculate, based at least in part on the sensor signals representative of the environment surrounding the vehicle and the relative motion of the first sensor module, at least one of a position of objects in the surrounding environment or movement of the objects in the surrounding environment. The sensor processor may also be configured to determine at least one of a position of the vehicle, an orientation of the vehicle, or a velocity of the vehicle based at least in part on the calculation of the at least one of the position of objects in the surrounding environment or the movement of the objects in the surrounding environment. In some examples, this may improve the accuracy of the determination of the position of the vehicle, the orientation of the vehicle, the velocity of the vehicle, the position of objects in the surrounding environment, and/or the movement of the objects in the surrounding environment, as compared, for example, to systems that do not determine or account for relative movement of the sensors.

The position of the vehicle may be represented by the north east down (NED) position of the vehicle, where the NED position is represented by three coordinate values corresponding respectively to the vehicle position along the northern axis, the vehicle position along the eastern axis, and the vehicle position along the vertical axis. As used herein, the position may refer to one or more of the three vehicle axis positions. However, other coordinate systems may be used to represent position or other information about a vehicle.

In some examples, the system may be implemented on a UAV. In such examples, the system may further include one or more processors and memory to store a vehicle control system executable by the one or more processors to control operation of the UAV based at least in part on at least one of the position of the vehicle, the orientation of the vehicle, the velocity of the vehicle, the position of objects in the surrounding environment, or the movement of the objects in the surrounding environment.

In some examples, the sensor may include an imager configured to capture an image frame sequence associated with movement of the at least one sensor module relative to the portion of the frame of the vehicle. The image frame sequence may include a plurality of image frames. In some examples, the sensor processor may include an image processor in communication with the imager and configured to receive image data representative of the image frames and estimate relative motion of the at least one sensor module based at least in part on two or more image frames of the image frame sequence. For example, the image processor may be configured to identify a marker associated with the at least one sensor module in a first image frame of the image frame sequence, identify the marker in a second image frame of the image frame sequence, and estimate the relative motion of the at least one sensor module based at least in part on a first location of the marker in the first image frame and a second location of the marker in the second image frame. In some examples, the image processor may be configured estimate the relative motion of the at least one sensor module based at least in part on a difference between the first location and the second location. In some examples, the image processor may be configured to identify the marker in a third image frame of the image frame sequence, and estimate the relative motion of the at least one sensor module based at least in part on the second location in the second image frame and a third location of the marker in the third image frame.

This disclosure is also generally directed to a method for improving the accuracy of information determined based on sensor signals obtained from a first sensor from among a plurality of sensors. The method may include receiving sensor signals from the first sensor, and receiving sensor signals from a second sensor from among the plurality of sensors. The sensor signals received from the second sensor may include sensor signals representative of a location of the first sensor relative to the second sensor. The method may further include calculating relative motion of the first sensor relative to the second sensor based at least in part on the sensor signals received from the second sensor, and creating data based at least in part on the relative motion estimation and the sensor signals from the first sensor. In some examples, this method may improve the accuracy of the information determined based on the sensor signals, for example, by accounting for changes in the location and/or orientation of the sensors, as compared to methods that do not determine or account for relative movement of the sensors.

In some examples, creating data based at least in part on the relative motion calculation and the sensor signals from the first sensor may include calculating, based at least in part on the relative motion calculation, the information determined based at least in part on the sensor signals obtained from the first sensor. In some examples, the second sensor may include an imager, and receiving sensor signals from the second sensor may include capturing an image frame sequence including a plurality of image frames representative of a location of the first sensor relative to the second sensor. For example, calculating the relative motion of the first sensor may include calculating the relative motion of the first sensor based at least in part on two or more image frames of the image frame sequence. For example, calculating the relative motion may include identifying a marker associated with the first sensor in a first image frame of the image frame sequence, identifying the marker in a second image frame of the image frame sequence, and calculating the relative motion of the first sensor based at least in part on a first location of the marker in the first image frame and a second location of the marker in the second image frame. In some examples, calculating the relative motion of the first sensor may include determining a difference between the first location and the second location, and calculating the relative motion based at least in part on the difference. In some examples of the method, it may also include identifying the marker in a third image frame of the image frame sequence, and calculating the relative motion of the first sensor based at least in part on the second location of the marker in the second image frame and a third location of the marker in the third image frame. In some examples, creating data based at least in part on the relative motion calculation and the sensor signals from the first sensor may include calculating, based at least in part on the relative motion calculation, the information determined based at least in part on the sensor signals obtained from the first sensor. In some examples, the method may further include controlling a vehicle based at least in part on the calculated information determined based at least in part on the sensor signals obtained from the first sensor.

In some examples, the marker may include a light signal associated with the first sensor. For example, the light signal may include an electromagnetic radiation signal, such as, for example, a signal from a light emitting diode (LED), a visible light signal, an infrared light signal, or an ultraviolet light signal.

This disclosure is also generally directed to a vehicle. The vehicle may include a frame, a propulsion system coupled to the frame to cause movement of the vehicle, and at least one sensor module coupled to the frame of the vehicle and configured to generate sensor signals representative of an environment surrounding the vehicle. The vehicle may further include a sensor coupled to the frame of the vehicle at a location spaced from the at least one sensor module and configured to generate sensor signals representative movement of the at least one sensor module relative to a portion of the frame of the vehicle. The vehicle may also include a sensor processor in communication with the sensor and the at least one sensor module. The sensor processor may be configured to receive the sensor signals representative of movement of the at least one sensor module and estimate relative motion of the at least one sensor module relative to the portion of the frame of the vehicle. The sensor processor may also be configured to receive the sensor signals representative of the environment surrounding the vehicle from the at least one sensor module, and calculate, based at least in part on the sensor signals received from the at least one sensor module and the relative motion of the at least one sensor module, at least one of a position of objects in the surrounding environment or movement of the objects in the surrounding environment. The sensor processor may also be configured to determine at least one of a position of the vehicle, an orientation of the vehicle, or a velocity of the vehicle based at least in part on the calculation of the at least one of the position of objects in the surrounding environment or the movement of the objects in the surrounding environment. In some examples, the vehicle may include a vehicle controller in communication the sensor processor and configured to control operation of the vehicle based at least in part on at least one of the calculated position of objects in the surrounding environment, the calculated movement of the objects in the surrounding environment, the determined position of the vehicle, the determined orientation of the vehicle, or the determined velocity of the vehicle.

The techniques and systems described herein may be implemented in a number of ways. Example implementations are provided below with reference to the following figures.

Figure 1:
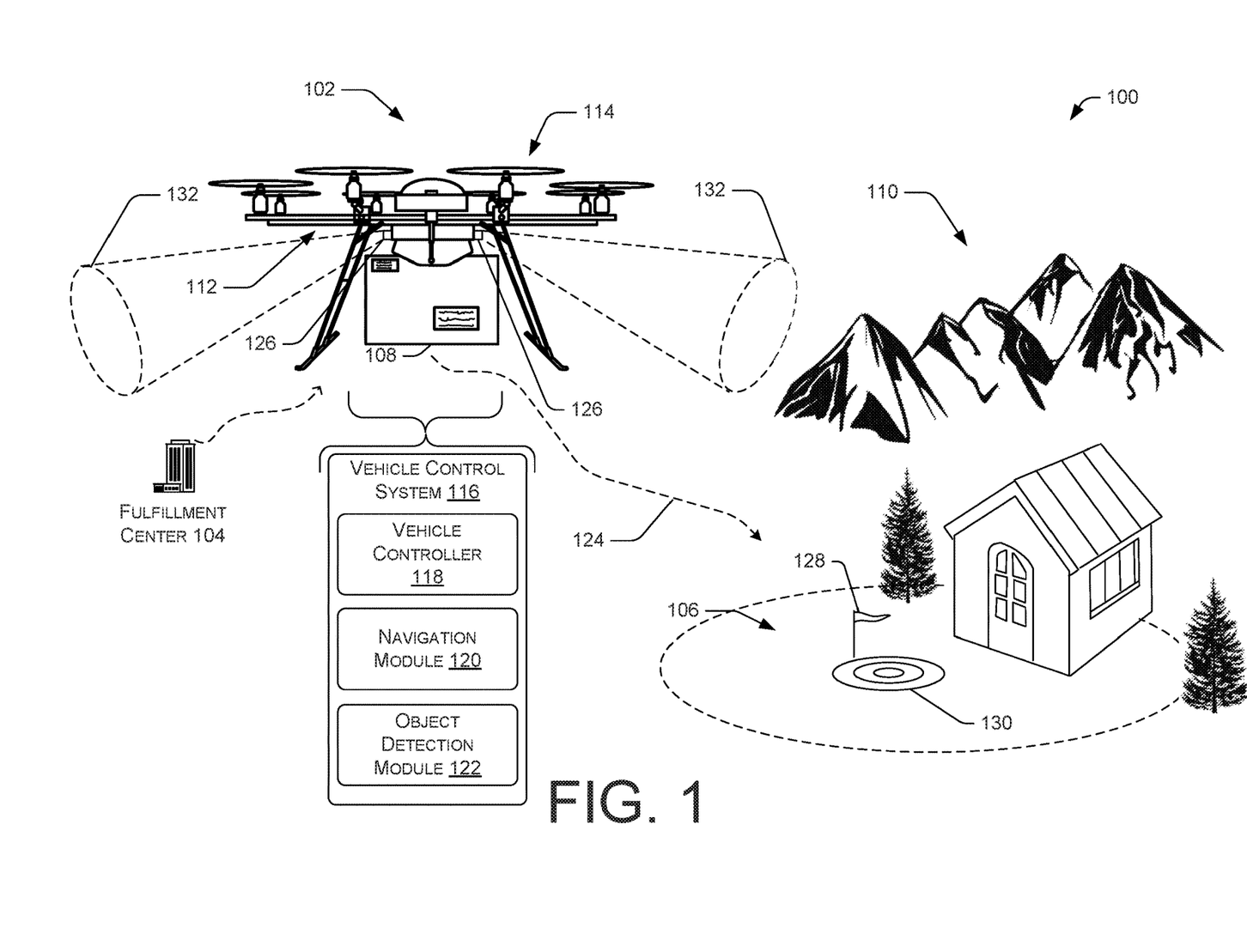
FIG. 1 is a schematic diagram of an illustrative environment that includes an unmanned aerial vehicle (UAV) configured to determine and use relative motion of sensor modules.

FIG. 1 is a schematic diagram of an illustrative environment 100 that includes a UAV 102 configured to travel through the environment 100 surrounding the UAV 102. The example environment 100 includes a fulfillment center 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, other flying objects, and electrical power towers and power wires.

The UAV 102 may be equipped with a number of components to enable the UAV 102 to perform operations during the delivery of the package 108. For example, the UAV 102 may include a frame 112 and a propulsion system 114 coupled to the frame 112 and configured to propel the UAV 102 through the environment 100. The components may also include a vehicle control system 116 configured to control the flight of the UAV 102 and navigate the UAV 102 to and from its destination 106. In some examples, the vehicle control system 116 may include a vehicle controller 118 (e.g., a flight controller), a navigation module 120, and an object detection module 122, as well as other components discussed below with reference to FIGS. 1-4. For example, the UAV 102 may travel under control of the vehicle controller 118 and along a flight path 124 toward the destination 106. The vehicle controller 118 may receive data from the navigation module 120 to assist the vehicle controller 118 with following the flight path 124 to arrive at the destination 106. The vehicle controller 118 may continually, or from time to time, provide control signals to the propulsion system 114 and flight control surfaces to cause changes in the velocity of the UAV 102, changes in heading, changes in altitude, changes in orientation, and/or other changes (e.g., pitch, roll, yaw, hover, etc.), for example, based at least in part on data from the navigation module 120. In addition, the UAV 102 may execute different controls based on different flight scenarios, such as a takeoff stage, a transport stage, a package deposit stage, and/or a landing stage of flight.

The object detection module 122 may receive sensor signals from one or more sensor modules 126 coupled to the frame 112 of the UAV 102. The sensor signals may be indicative of objects in the surrounding environment 100. In some examples, the object detection module 122 may identify the objects and inform the vehicle controller 118, and for other reasons, such as to provide communications to the object or to a central command, etc. For example, the object detection module 122 may identify objective markers 128 via analysis of imagery captured by the sensor modules 126. The objective markers 128 may be associated with a waypoint, a drop zone 130 for the destination 106, and/or associated with other locations.

The sensor modules 126 may include one or more sensors configured to generate sensor signals representative of the environment 100 surrounding the UAV 102 and through which the UAV 102 passes. In some examples, the sensor modules 126 may be configured to detect objects or obstacles to avoid, detect objective markers, assist with navigation, and/or assist with the performance of other functions. The UAV 102 may, at times, perform autonomous flight using information captured by the sensor modules 126.

In some examples, the sensors of the sensor modules 126 may provide a field of view 132, for example, as schematically shown in FIGS. 1-4, which may be used for vehicle control and/or navigation. In some examples, the sensor modules 126 may include one or more optical sensors, such as, for example, single lens cameras, stereo cameras, multi-lens cameras, digital still cameras, red green blue (RGB) cameras, video cameras, thermographic cameras, infrared sensors or cameras, light detection and ranging (LIDAR) systems, and/or any other sensors capable of converting light or electromagnetic radiation into electrical signals that are indicative of an object or objects in the field of view 132 of the optical sensor. Other types of sensors are contemplated, such as, for example, sound navigation and ranging (SONAR) sensors, or any other type of sensor capable of detecting and/or generating a signals representative of an object in the field of view 132 of the sensor. In some examples, an optical sensor may include a stereo camera having two or more imaging elements capable of being used together to capture or obtain images of three-dimensional space. For example, a stereo camera may be a digital camera and may include a lens. In some examples, the stereo camera may include a separate image sensor, detector, or film frame for each lens. In some examples, a single sensor may be used in combination with multiple lenses of the stereo camera.

Figure 2:
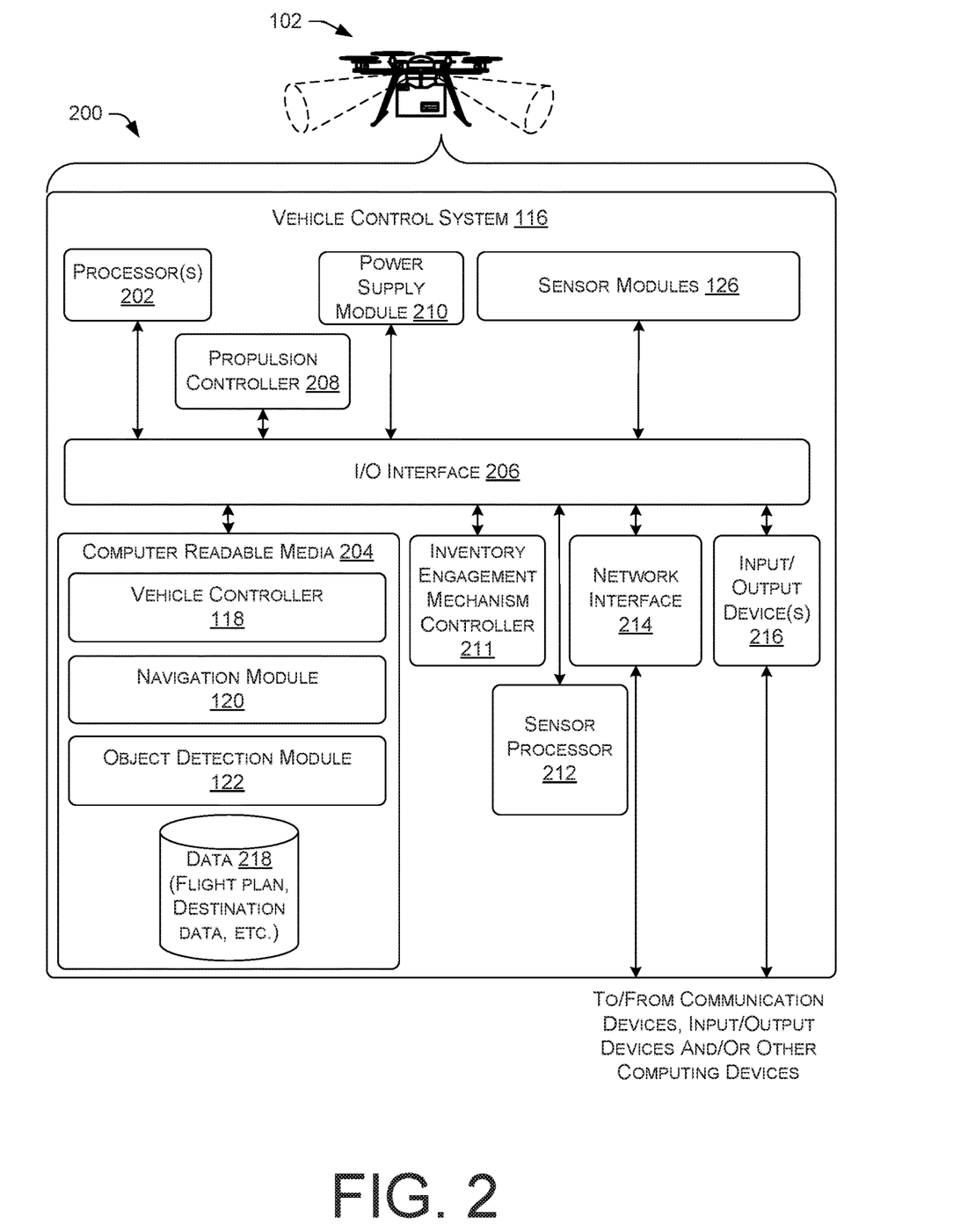
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed herein. In the example implementation, the UAV architecture 200 includes one or more processors 202, coupled to a non-transitory computer readable media 204 via an input/output (I/O) interface 206. The UAV architecture 200 may also include a propulsion controller 208 configured to control operation and output the propulsion system 114, and a power supply module 210 configured to control operation of a power supply (not shown) configured to supply power to the UAV 102 for operation of its systems.

The example architecture 200 shown in FIG. 2 also includes the vehicle controller 118, the navigation module 120, and the object detection module 122, which may be part of the computer readable media 204. The UAV architecture 200 may further include an inventory engagement mechanism controller 211 to interact with the package 108 and thereby secure and/or release the package 108 based on package control logic.

The sensor modules 126 are also part of the example architecture 200 and are in communication with a sensor processor 212, which may process sensor signals received from the sensor modules 126, for example, for use by the vehicle controller 118, the navigation module 120, and/or the object detection module 122, to assist with controlling the navigation and flight of the UAV 102. For example, the sensor signals may be used by the sensor processor 212 to generate a digital scene representative of the environment 100 surrounding the UAV 102, for example, in three dimensions. In some examples, the architecture 200 also includes a network interface 214 configured to facilitate data communications between the UAV 102 and other devices attached to a network, such as, for example, other computer systems and/or other vehicle control systems of other UAVs. For example, the network interface 214 may enable wireless communication between numerous UAVs. In various implementations, the network interface 214 may support communication via wireless general data networks, such as a Wi-Fi network. In some examples, the network interface 214 may support communication via telecommunications networks such as cellular communication networks, satellite networks, and the like.

The example architecture 200 shown in FIG. 2 also includes one or more input/output devices 216, such as, for example, one or more displays, imaging devices, thermal sensors, infrared sensors, time of flight sensors, accelerometers, gyroscopes, pressure sensors, weather sensors, optical sensors, gimbals, landing gear, and/or other devices that may be used to assist operation of the UAV 102, and/or other input/output devices commonly used in aviation. Multiple input/output devices 216 may be present and controlled by the UAV architecture 200.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202, such as, for example, data 218. In various implementations, the non-transitory computer readable media 204 may be implemented using any suitable memory technology, such as static random access memory (SRAM), synchronous dynamic RAM (SDRAM), nonvolatile/flash-type memory, or any other type of memory. In the illustrated implementation, program instructions and data implementing desired functions, such as those described above, are shown stored within the non-transitory computer readable memory. In other implementations, program instructions, data and/or flight paths may be received, sent, or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 214.

In one implementation, the I/O interface 206 may be configured to coordinate I/O traffic between the processor(s) 202, the non-transitory computer readable media 204, and any peripheral devices, the network interface 214 or other peripheral interfaces, such as input/output devices 216. In some implementations, the I/O interface 206 may perform any necessary protocol, timing, or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

In some examples, the propulsion controller 208 communicates with the navigation module 120 and adjusts the power of each propulsion member (e.g., each propeller motor or each thruster) of the propulsion system 114 to guide the UAV 102 along the determined flight path 124. The power supply module 210 may control the charging and any switching functions associated with one or more power modules (e.g., batteries) of the UAV 102.

As explained herein, the navigation module 120 may include systems to facilitate navigating the UAV 102 to and/or from a location. The inventory engagement mechanism controller 211 communicates with the actuator(s) or motor(s) (e.g., a servo motor) used to engage and/or disengage inventory, such as the package 108. For example, when the UAV 102 is positioned over a level surface at a delivery location, the inventory engagement mechanism controller 211 may provide an instruction to a motor that controls the inventory engagement mechanism to release the package 108.

In some embodiments, the computer readable media 204 may store the vehicle controller 118, the navigation module 120, and the object detection module 122. The components may access and/or write data 218, which may include flight plan data, log data, destination data, image data, and object data, and so forth. The operations of the vehicle controller 118, the navigation module 120, and the object detection module 122 are described herein by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Figure 3:
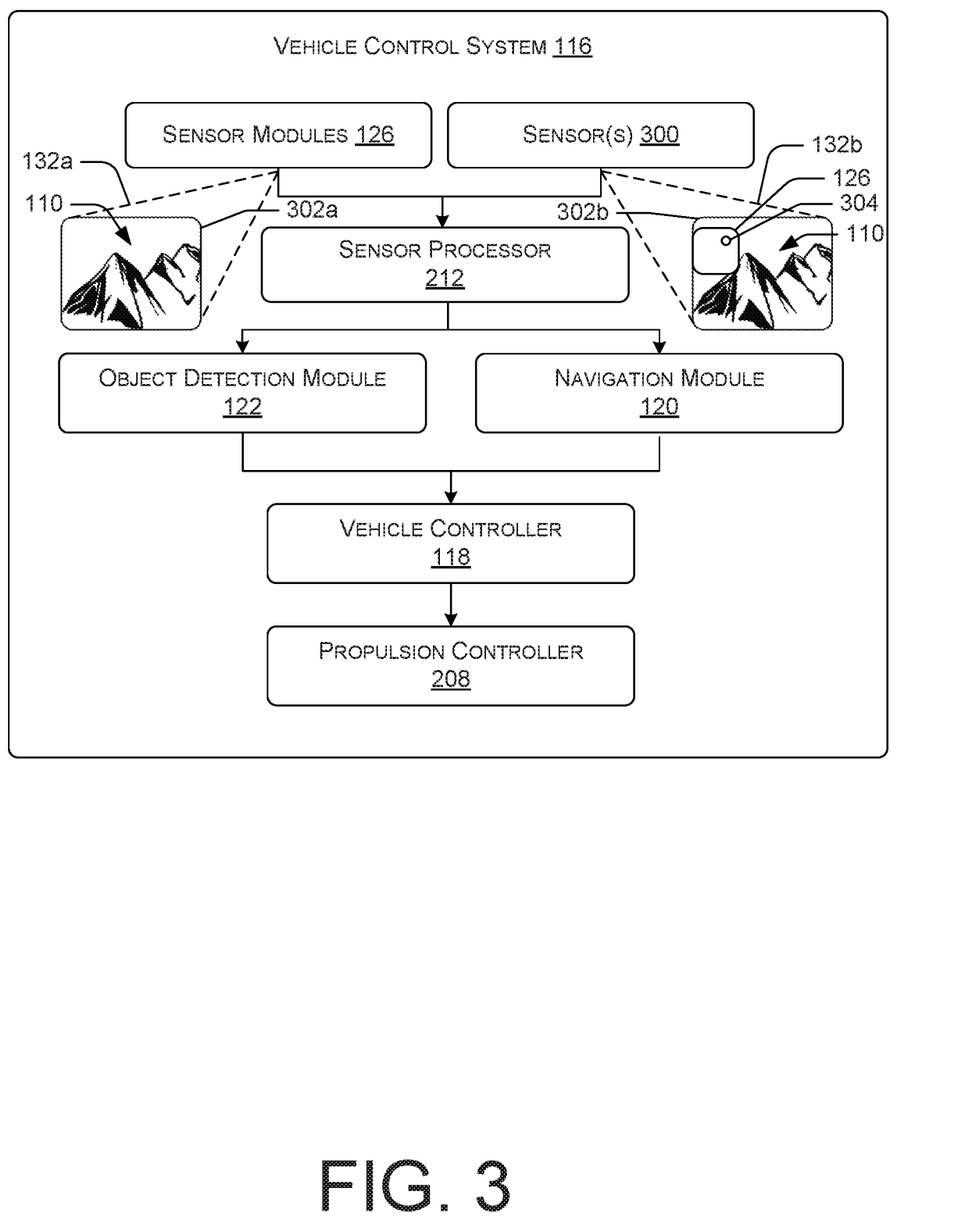
FIG. 3 is a block diagram of an illustrative vehicle control system configured to determine and use relative motion of sensor modules.

FIG. 3 is a block diagram of an example of the vehicle control system 116. In some examples, the vehicle control system 116 may include one or more sensor modules 126 including one or more sensors as described herein. The sensor modules 126 may be coupled to the frame 112 of the UAV 102, either directly or indirectly. In addition, the example vehicle control system 116 may include one or more sensors 300, and the one or more sensors 300 may be coupled to the frame 112 of the UAV 102, either directly or indirectly. The one or more sensors 300 may be any type of sensor, such as those described herein. The sensors 300 may be incorporated into one of more of the sensor modules 126, or they may be supplemental to the one or more sensors of the one or more sensor modules 126. For example, one or more of the sensors 300 may be incorporated into (e.g., either directly or indirectly coupled to) one or more of the sensor modules 126. In some examples, the sensors 300 may not be incorporated into a sensor module 126 with other sensors. They may be stand-alone sensors.

In some examples, the sensors 300 may be calibrated with respect to respective sensor modules 126. For example, with the UAV 102 in a static mode (i.e., not moving or flying), the sensors 300 may sense respective sensor modules 126, and the sensor processor 212 may be configured to determine an initial relative position of the sensor modules 126 relative to the respective sensors 300 to establish a baseline against which relative motion of the sensor modules 126 may be determined, for example, during flight of the UAV 102.

In the example schematically shown in FIG. 3, the sensor modules 126 include at least one imager configured to capture a sequence of image frames 302 from the field of view 132 of the sensor module 126 as the UAV 102 travels through the environment 100. For example, the image frame 302a provides an image frame of the image frame sequence that includes terrain 110, which includes mountains, in its field of view 132a. In the image frame 302b, the image frame of the image frame sequence includes the terrain 110, which includes mountains. In addition, the image frame 302b also includes another sensor module 126 in the field of view 132b.

In addition, the image frame 302b also includes a marker 304 associated with the sensor module 126, as discussed further herein. In some examples, the marker 304 may include a light signal associated with the sensor module 126. For example, the light signal may include an electromagnetic radiation signal, such as, for example, a signal from an LED, a visible light signal, an infrared light signal, or an ultraviolet light signal. This may result in the marker 304 being more easily identified by the sensor 300 and/or the sensor processor 212. In some examples, the marker 304 may be configured to facilitate sensing by the sensor 300 when the sensor 300 is SONAR. For example, the marker 304 may include a surface characteristic, material, and/shape configured to be sensed by SONAR. In some examples, the marker 304 may be configured to emit sound signals configured to be sensed by SONAR. Other types of markers are contemplated.

In the example shown in FIG. 3, the sensor signals from the sensor modules 126 and sensors 300 are received by the sensor processor 212, where the sensor signals are processed to transform them into a form for use by one or more of the object detection module 122, the navigation module 120, and/or the vehicle controller 118. In some examples, the sensor processor 212 may be configured to synchronize the sensor signals received from the sensor modules 126 and the sensor signals received from the sensors 300, for example, so that the respective sensor signals may be correlated with one another. In some examples, the sensor processor 212 may be an image processor and may be configured to generate a digital scene (e.g., a three-dimensional digital scene) of the environment 100 surrounding the UAV 102 and through which the UAV 102 travels. In some examples, the sensor processor 212 may use known image processing techniques to generate the digital scene.

As shown in the example of FIG. 3, data signals representative of the surrounding environment may be supplied to the object detection module 122 and/or the navigation module 120. For example, the object detection module 122 may use the signals to identify objects in the environment 100 surrounding the UAV 102. Such objects may include terrain 110, such, as for example, mountains, trees, buildings, bridges, telephone poles and wires, other flying objects, and electrical power towers and power wires. In some examples, the objects may include objective markers, such as the objective marker 128 shown in FIG. 1, which may be used to assist with navigation of the UAV 102. For example, an objective marker may be used to identify the destination for delivery of the package 108. In some examples, the object detection module 122 may be configured to estimate the position, orientation, and/or velocity of an object, and/or to predict the future position, orientation, and/or velocity of the identified object.

In the example shown in FIG. 3, the navigation module 120 is also configured to receive the sensor signals from the sensor processor 212. In some examples, the navigation module 120 may use information from the sensor signals to supplement or improve the accuracy of the navigation of the UAV 102. For example, data from the sensor signals may be used to confirm or improve the accuracy of the navigation information generated by the navigation module 120. In some examples, data related to the environment surrounding the UAV 102 (e.g., image data) may be used to confirm or correct any discrepancies in the navigation data received from other sources and used by the navigation module 120 to navigate the UAV 102 along its flight path 124 to its destination 106. For example, the navigation module 120 may include one or more global positioning satellite (GPS) receivers for receiving signals from global positioning satellites to determine the position of the UAV 102, and/or one or more gyroscopes and accelerometers to determine the position, orientation (e.g., pitch, roll, and yaw), and/or velocity of the UAV 102, for example, using inertial navigation techniques. In some examples, the navigation module 120 may be configured to also receive sensor signals from the sensor processor 212 (e.g., image data from an image processor) to confirm one or more of the position, orientation, and/or velocity of the UAV, for example, using image-based dead reckoning techniques. The position of the UAV 102 may be represented by the north east down (NED) position of the UAV 102.

For example, the sensor modules 126 and/or sensors 300 may include one or more imagers in communication with the sensor processor 212, which may be an image processor configured to analyze images received from the sensor modules 126 and/or sensors 300. The image processor may be configured to analyze images received from the sensor modules 126 and/or sensors 300 and estimate the relative motion of the UAV 102 relative to, for example, a prior in time position estimation. For example, at any given time, the sensor modules 126 and/or sensors 300 may capture image data of the terrain 110 through which the UAV 102 travels, and the sensor processor 212 may be configured to estimate one or more of the distance, direction, and altitude through which the UAV 102 has moved relative to the position of the UAV 102 at a moment prior in time. The sensor processor 212 may use any image analysis techniques known to those skilled in the art, such as, for example, feature extraction techniques to identify lines, edges, ridges, textures, and shapes in the image data. In some examples, the images may be pre-processed to, for example, re-sample them, reduce noise in the data, and/or enhance the contrast in the images. In some examples, the sensor processor 212 may use one or more of the following techniques to analyze the images: point of interest selection, segmentation, image recognition, and image registration. In some examples, multi-view stereo techniques may be used to acquire and analyze the images.

In some examples, the navigation module 120 may be configured to receive the relative motion estimation obtained from the sensor processor 212 and combine it with the position estimation from, for example, a GPS receiver and/or an inertial navigation system. Although the example sensor processor 212 and navigation module 120 are each shown as separate components, the sensor processor 212 and navigation module 120 may be integral with one another or with other portions of the vehicle control system 116. The navigation module 120, for example, by combining the data associated with the position estimation from a GPS receiver and/or an inertial navigation system, and the data associated with the relative motion estimation from the navigation module 120, may determine an updated position estimation.

For example, the navigation module 120 may estimate the updated position estimation by starting from a first position estimation received from a GPS receiver and/or an inertial navigation system, and adding to the first position estimation one or more of the distance, direction, and altitude change from the relative motion estimation. In other words, the navigation module 120, from a known starting point, adds one or more of the distance of movement, the direction of movement, and the altitude change estimates to determine the position to which the UAV 102 has travelled. In this example manner, the accuracy and/or responsiveness of the navigation module 120 may be increased.

In some examples, the object detection module 122 and/or the navigation module 120 may estimate, based on at least in part on the sensor signals received from the sensor processor 212, at least one of the position of the UAV 102, the velocity of the UAV 102, the orientation of the UAV 102, the positions of objects in the surrounding environment 100, and/or movement of the objects in the surrounding environment 100. In some examples, this estimation may be performed in combination with, or by, other components of the vehicle control system 116.

As shown in FIG. 3, the example vehicle controller 118 may receive information in the form of data signals from the object detection module 122 and/or the navigation module 120. For example, the vehicle controller 118 may receive data signals representative of the estimation of at least one of the position of the UAV 102, the orientation of the UAV 102, the velocity of the UAV 102, the positions of objects in the surrounding environment 100, and/or movement of the objects in the surrounding environment 100. The vehicle controller 118 may use some or all of the information in the data signals to control flight of the UAV 102, for example, by sending signals in the form of control commands to the propulsion controller 208 and/or to flight control surfaces of the UAV 102. In this example manner, the vehicle control system 116 may control and navigate the UAV 102 along its flight path 124 to its destination 106. Along the way, the UAV 102 may avoid terrain features 110 and/or objects in the environment 100 surrounding the UAV 102 based on sensor signals generated by the sensor modules 126 and/or sensors 300, and either return to its flight path 124 or modify its flight path 124 to account for avoiding the terrain features 110 and/or objects.

In some examples, the vehicle control system 116 may include a plurality of sensor modules 126 configured to be coupled to the frame 112 of a vehicle, such as, for example, a UAV 102, and generate sensor signals representative of the environment 100 surrounding the UAV 102. The vehicle control system 116 may also include one or more of the sensors 300 coupled to the frame 112 of the UAV 102 at a location spaced from at least one of the sensor modules 126 and configured to generate sensor signals representative of movement of the at least one sensor module 126 relative to a portion of the frame 112 of the UAV 102. In some examples, the vehicle control system 116 may also include the sensor processor 212 in communication with the one or more sensors 300 and configured to receive the sensor signals representative of movement of the at least one sensor module 126 and estimate relative motion of the at least one sensor module 126 relative to the portion of the frame 112 of the UAV 102. In some examples, the portion of the frame 112 may be the portion of the frame 112 on which the sensor 300 is mounted. In some examples, the portion of the frame 112 may correspond to the center of gravity of the UAV 102. Other frame portions are contemplated. The relative motion of a sensor module 126 relative to the frame 112 of the UAV 102 may include the motion relative to any portion of the UAV 102 that is directly or indirectly coupled to the frame 112 of the UAV 102. In some examples, the relative motion of a sensor module 126 may also include any orientation changes of the sensor module 126 relative to the frame 112 of the UAV 102, such as, for example, any orientation changes relative to one or more of three orthogonal axes such as x-, y-, and z-axes.

In some examples, the sensor processor 212 is in communication with the sensor 300 and the at least one sensor module 126. In some examples, the senor processor 212 may be configured to receive the sensor signals representative of the environment 100 surrounding the UAV 112 from the plurality of sensor modules 126, and calculate, based at least in part on the sensor signals representative of the environment 100 surrounding the UAV 102, at least one of the position of the UAV 102, the orientation of the UAV 102, the velocity of the UAV 102, the positions of objects in the surrounding environment 100, and/or movement of the objects in the surrounding environment 100. In some examples, the sensor processor 212 may also be configured to calculate, based at least in part on the relative motion estimation, the estimation of one or more of the position of the UAV 102, the orientation of the vehicle UAV 102, the velocity of the UAV 102, the position of objects in the surrounding environment 100, and the movement of the objects in the surrounding environment 100.

For example, the sensor 300 may include an imager configured to capture an image frame sequence associated with movement of the sensor module 126 relative to the portion of the frame 112 of the UAV 102. In some examples, the sensor processor 212 may include an image processor in communication with the imager and configured to receive image data representative of the image frames and estimate relative motion of the sensor module 126 based at least in part on two or more image frames of the image frame sequence. For example, the image processor may be configured to identify a marker associated with the sensor module 126 in a first image frame of the image frame sequence, identify the marker in a second image frame of the image frame sequence, and estimate the relative motion of the sensor module 126 based at least in part on a first location of the marker in the first image frame and a second location of the marker in the second image frame. More specifically, the image processor may be configured estimate the relative motion of the sensor module 126 based at least in part on a difference between the first location of the marker and the second location of the marker. In some examples, the image processor may be configured to identify the marker in a third image frame of the image frame sequence and estimate the relative motion of the sensor module 126 based at least in part on the second location and a third location of the marker in the third image frame. A similar process may be performed for a plurality of sensor modules 126 associated with the UAV 102.

In some examples, by calculating the sensor information received by from one or more of the sensor modules 126, the accuracy of information determined based on the sensor signals may be improved, for example, as compared to systems that do not perform such a calculation. For example, by improving the accuracy of the position estimation of the sensor modules 126 relative to the UAV 102, the digital scene generated by the vehicle control system 116 may be more accurate because the system accounts for movement of the sensor modules 126 relative to the frame 112 of the UAV 102. This may reduce or correct inaccuracies caused by movement or vibration of the sensor modules 126 during flight of the UAV 102, which may be caused by flexing of the frame 112 of the UAV 102.

Figure 4:
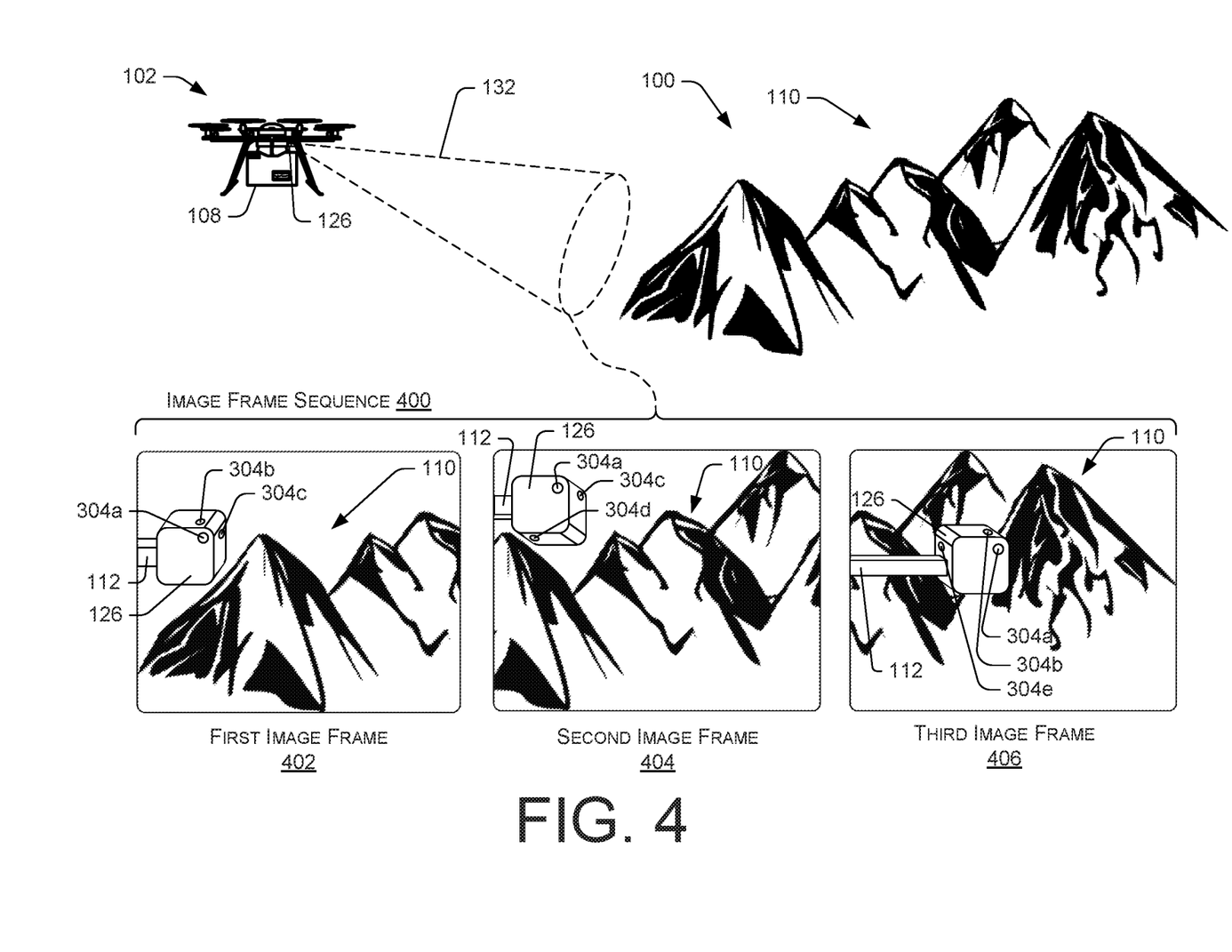
FIG. 4 is a schematic diagram of an illustrative image frame sequence.

FIG. 4 is a schematic diagram of an example environment 100 through which the UAV 102 travels, and an example of an image frame sequence 400 obtained by example operation of one of the sensors 300 (see FIG. 3). In the example shown, the sensor 300 is an imager according to any of the types of imagers identified herein. In some examples, the imager 300 may be part of one of the sensor modules 126. In some examples, the sensor 300 may be an individual, stand-alone sensor coupled to the UAV 102, for example, to the frame 112 of the UAV 102. As the UAV 102 travels through environment 100, one or more of the sensors 300 may capture images in the field of view 132 of the terrain 110, which in the example depicted in FIG. 4, includes landscape features including mountains. Other landscape features are contemplated, such as, for example, trees, buildings, bridges, telephone poles and wires, and electrical power towers and power wires. The field of view 132 of the sensors 300 and/or image modules 126 captures image frames including data representative of the terrain features. For example, the sensors 300 and/or sensor modules 126 are configured to capture the image frame sequence 400 associated with the environment 100 through which the UAV 102 travels.

In the example shown in FIG. 4, also in the field of view 132 of the sensor 300 is a sensor module 126 coupled to a portion of the frame 112 of the UAV 102. In some examples, the sensor module 126 may include one or more markers 304 associated with the sensor module 126. For example, the one or more markers 304 may be coupled to the sensor module 126 at location(s) facilitating a view of the one or more markers 304 from the sensor 300, so that the one or more markers 304 may be captured in the image frame sequence 400. In some examples, the sensor processor 212 may include an image processor in communication with the sensor 300, and the sensor processor 212 may be configured to receive image data representative of the image frames and estimate the relative motion of the sensor module 126 relative to UAV 102, for example, relative to a portion of the frame 112 of the UAV 102, based at least in part on two or more image frames of the image frame sequence 400. In some examples, the sensor processor 212 may be configured to calculate, based at least in part on the relative motion estimation, the position of the sensor module 126 relative to the UAV 102. In some examples, the position calculation may also include a calculation of the relative orientation of the sensor module 126, for example, relative to one or more of three orthogonal axes. This may, in turn, be used to calculate an estimation of at least one of the position of the UAV 102, the orientation of the UAV 102, the velocity of the UAV 102, the position of objects in the surrounding environment 100, and the movement of the objects in the surrounding environment 100. For example, if these estimations are made in part from sensor signals received from the sensor module 126, and the estimations are based on the location of the sensor module 126 on the UAV 102, the estimation of the motion of the sensor module 126 relative to the UAV 102 may improve the accuracy of the estimations based on the sensor signals received from the sensor module 126, for example, as compared to estimations that do not take into account the movement of the sensor module 126 relative to the UAV 102. In some examples, this configuration may be performed for one or more (e.g., all) of the sensor modules 126 associated with the UAV 102.

In some examples, the sensor processor 212 may be configured to receive sensor signals from the sensor 300 and identify one or more markers 304*a*-304*c* in a first image frame 402 of the image frame sequence 400. For example, the markers 304*a*-304*c* may be associated with one of the sensor modules 126, as shown in FIG. 4. As the UAV 102 continues to travel through the environment 100, the sensor modules 126 and the sensor 300 may capture additional image frames, and the sensor processor 212 may be configured to identify one or more of the markers 304a, 304c, and 304d in a second image frame 404 of the image frame sequence 400. In the example shown, the marker 304a has moved higher, and the sensor module 126 has changed orientation in the second image frame 404 relative to the first image frame 402. This example movement is representative of movement of the sensor module 126 relative to the UAV 102. For example, the frame 112 of the UAV 102 may vibrate and/or flex under load, such that the sensor module 126 moves relative to the remainder of the UAV 102. In some examples, the sensor processor 212 may thereafter estimate the relative motion of the sensor module 126 based at least in part on the first location of the marker 304a in the first image frame 402 and the second location of the marker 304a in the second image frame 404. For example, the sensor processor 212 may be configured estimate the relative motion of the sensor module 126 based at least in part on a difference between the first location of the marker 304a in the first image frame 402 and the second location of the marker 304a in the second image frame 404. This difference is associated with the relative movement of the sensor module 126 relative to the remainder of the UAV 102, and thus, via analysis of the first and second image frames 402 and 404, the relative motion of the sensor module 126 may be estimated. The estimated relative motion may be provided to, for example, the object detection module 122 and/or the navigation module 120, so that the motion of the sensor module 126 may accounted for when estimating one or more of the location of the UAV 102, the orientation of the UAV 102, the velocity of the UAV 102, the location of objects in the environment 100, and the movement of objects in the environment 100.

In some examples, the sensor modules 126 may include more than one marker 304, for example, as shown in FIG. 4. This may assist with determining relative orientation changes of the sensor modules 126. For example, in the first image frame 402, the sensor module 126 includes example markers 304a, 304b, and 304c, each on different surfaces of the sensor module 126. In some examples, more than one of the markers 304 may be on a single surface of the sensor module 126, such as a surface readily viewable by the sensor 300 viewing the sensor module 126. In some examples, other surfaces of the sensor module 126 may each include a marker 304. For example, as shown in the second image frame 404, a marker 304d is on a lower surface of the sensor module 126, and a marker 304e is on a left-hand surface of the example sensor module 126, as shown in the third image frame 406.

As shown in FIG. 4, as the UAV 102 continues to travel through the environment 100, the sensor 300 may capture additional image frames, and the sensor processor 212 may be configured to identify one or more of the markers 304a, 304b, and 304e in a third image frame 406 of the image frame sequence 400. In the example shown, the marker 304a has moved lower and farther to the right of the third image frame 406 relative to the second image frame 404. In addition, the orientation of the sensor module 126 has changed relative to the second image frame 404. The sensor processor 212 may be configured to estimate the relative motion of the sensor module 126 based at least in part on the second location in the second image frame 404 and the third location of the marker 304a in the third image frame 406, for example, in the manner described above with respect to the first and second image frames 402 and 404. In some examples, the sensor processor 212 may also be configured to include estimated orientation changes of the sensor module 126 in its estimation of the relative motion of the sensor module 126, for example, based at least in part on changes in the respective locations of one or more of the markers 304a-304e.

In some examples, this process may be continued during operation of the UAV 102, so that the relative motion of the sensor module 126 may be continuously monitored and accounted for. For example, this process may be repeated as the UAV 102 travels through the environment 100, and the sensor processor 212 may continue to update the relative motion estimation of the sensor module(s) 126 as the sensor(s) 300 and sensor module(s) 126 continue to capture additional image frames, and the sensor processor 212 continues to identify and track markers 304 through the image frames of the image frame sequence 400.

Although FIGS. 1-4 depict a sensor system associated with the UAV 102, other sensor systems may incorporate the concepts disclosed herein. For example, the concepts disclosed herein may be used with any sensor system including more than one sensor and the location of the sensors may be important in determining information based at least in part on signals generated by one or more of the sensors of the system. The concepts may be deployed in security systems and facilities, such as, for example, order fulfillment centers. In addition, although the concepts described herein are deployed on the example UAV 102, other types of vehicles may deploy the sensor system concepts described herein, such as land vehicles (cars, trucks, etc.), marine vehicles (boats, ships, submarines, etc.), and/or other types of aircraft.

Figure 5:
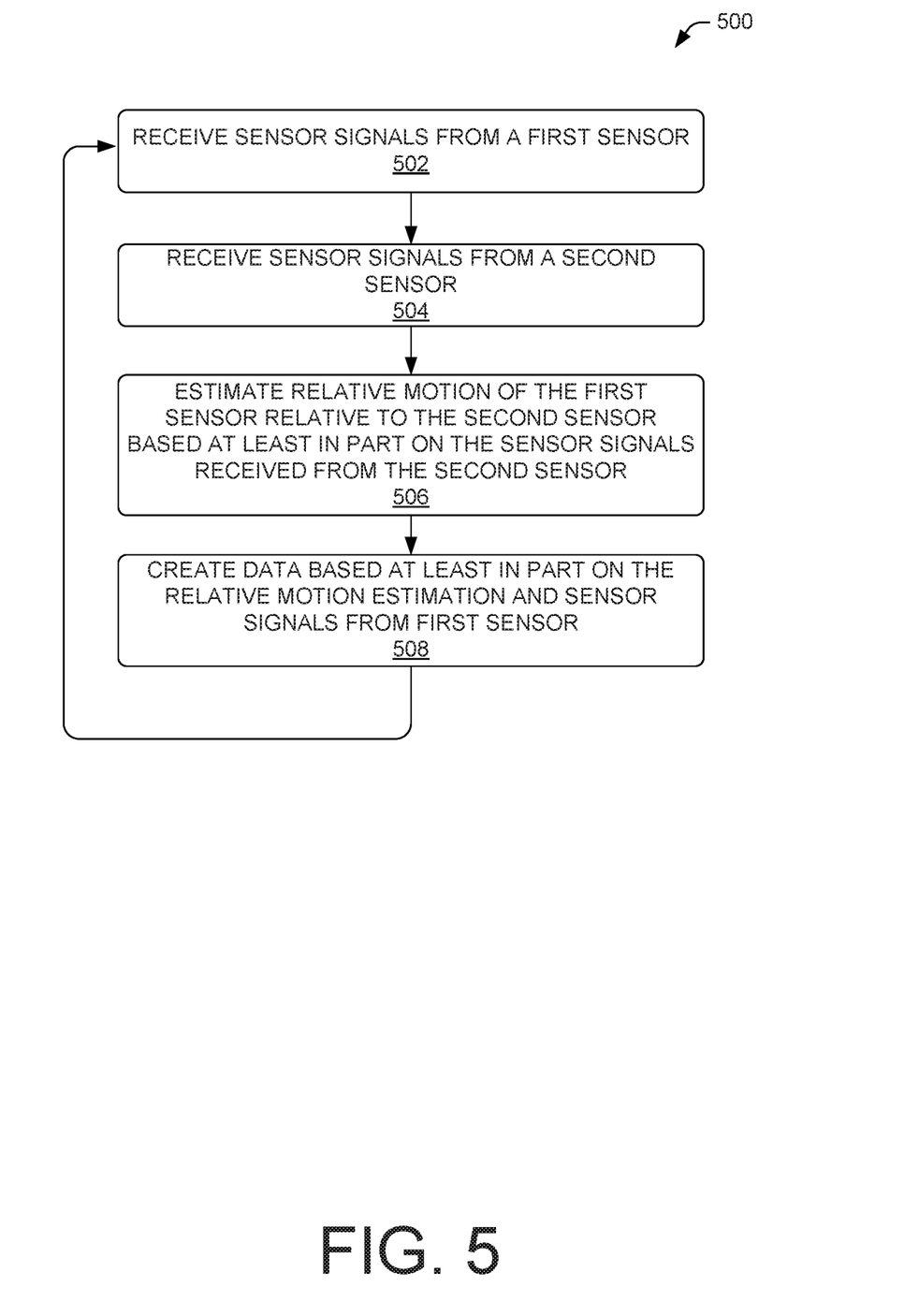
FIG. 5 is a flow diagram of an illustrative process for improving the accuracy of information determined based on sensor signals.
Figure 6:
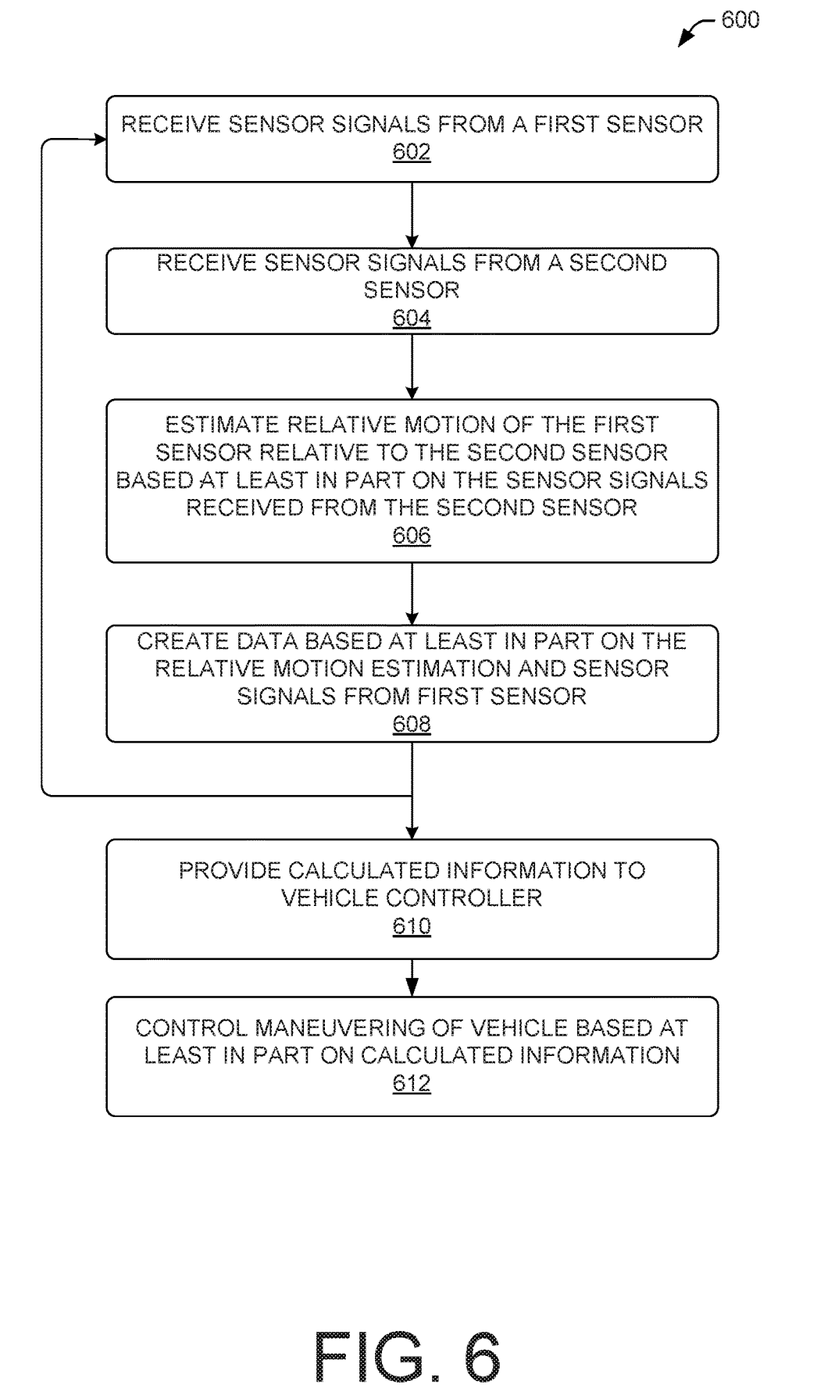
FIG. 6 is a flow diagram of an illustrative process for controlling a vehicle.

FIGS. 5 and 6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 for improving the accuracy of information determined based on sensor signals obtained from a first sensor from among a plurality of sensors. This process may be applicable with any sensor system including more than one sensor, where the location of the sensors may be important in determining the information based at least in part on signals generated by one or more of the sensors of the system.

In the example process 500 shown FIG. 5, at 502, the example process 500 may include receiving sensor signals from a first sensor. In some examples, the first sensor may be configured to generate sensor signals representative of an environment. For example, the first sensor may be configured to generate sensor signals representative of an environment surrounding a vehicle. In some examples, the first sensor may be part of a sensor module including the first sensor and in some examples, other sensors. For example, the sensor signals may be received by a sensor processor, such as an image processor configured to process image data.

At 504, the example process 500 may include receiving sensor signals from a second sensor from among a plurality of sensors. In some examples, the sensor signals received from the second sensor may include sensor signals representative of a location of the first sensor relative to the second sensor. In some examples, the second sensor may also be configured to generate sensor signals representative of an environment, such as sensor signals representative of an environment surrounding a vehicle. In some examples, the second sensor may be part of a sensor module including the second sensor and in some examples, other sensors. In some examples, the second sensor may include an imager, and receiving sensor signals from the second sensor may include capturing an image frame sequence including a plurality of image frames representative of a location of the first sensor relative to the second sensor. For example, the sensor signals from the second sensor may be received by a sensor processor, such as an image processor configured to process image data.

At 506, the example process 500 may include estimating the relative motion of the first sensor relative to the second sensor based at least in part on the sensor signals received from the second sensor. In some examples, estimating the relative motion of the first sensor may include estimating the relative motion of the first sensor based at least in part on two or more image frames of the image frame sequence. In some examples, estimating the relative motion of the first sensor may include identifying a marker associated with the first sensor in a first image frame of the image frame sequence, identifying the marker in a second image frame of the image frame sequence, and estimating the relative motion of the first sensor based at least in part on the first location of the marker in the first image frame and the second location of the marker in the second image frame. In some examples, the marker may include a light signal associated with the first sensor. In some examples, estimating the relative motion of the first sensor may include determining a difference between the first location and the second location, and estimating the relative motion based at least in part on the difference. For example, estimating the relative motion may be performed by a sensor processor, such as an image processor configured to identify markers in image data and estimate motion based on changes of location of the markers.

At 508, the example process 500 may include creating data based at least in part on the relative motion estimation and the sensor signals from the first sensor. For example, a sensor processor such as an image processor, may calculate, based at least in part on sensor signals representative of an environment and the relative motion of the first sensor, at least one of a position of objects in the environment or movement of the objects in the environment.

In some examples, at least some portions of the process 500 may be repeated, for example, by returning to 502 after 508.

Some examples of the process 500 may be deployed as part of a process for controlling a vehicle, such as, for example, a UAV.

FIG. 6 is a flow diagram of an illustrative process 600 for controlling a vehicle. At 602, the example process 600 may include receiving sensor signals from a first sensor. In some examples, the first sensor may be configured to generate sensor signals representative of an environment. For example, the first sensor may be configured to generate sensor signals representative of an environment surrounding a vehicle. In some examples, the first sensor may be part of a sensor module including the first sensor and in some examples, other sensors. For example, the sensor signals may be received by a sensor processor, such as an image processor configured to process image data.

At 604, the example process 600 may include receiving sensor signals from a second sensor from among the plurality of sensors. In some examples, the sensor signals received from the second sensor may include sensor signals representative of a location of the first sensor relative to the second sensor. In some examples, the sensor signals received from the second sensor may include sensor signals representative of a location of the first sensor relative to the second sensor. In some examples, the second sensor may also be configured to generate sensor signals representative of an environment, such as sensor signals representative of an environment surrounding a vehicle. In some examples, the second sensor may be part of a sensor module including the second sensor and in some examples, other sensors. In some examples, the second sensor may include an imager, and receiving sensor signals from the second sensor may include capturing an image frame sequence including a plurality of image frames representative of a location of the first sensor relative to the second sensor. For example, the sensor signals from the second sensor may be received by a sensor processor, such as an image processor configured to process image data.

At 606, the example process 600 may include estimating the relative motion of the first sensor relative to the second sensor based at least in part on the sensor signals received from the second sensor. In some examples, estimating the relative motion of the first sensor may include estimating the relative motion of the first sensor based at least in part on two or more image frames of the image frame sequence. In some examples, estimating the relative motion of the first sensor may include identifying a marker associated with the first sensor in a first image frame of the image frame sequence, identifying the marker in a second image frame of the image frame sequence, and estimating the relative motion of the first sensor based at least in part on the first location of the marker in the first image frame and the second location of the marker in the second image frame. In some examples, the marker may include a light signal associated with the first sensor. In some examples, estimating the relative motion of the first sensor may include determining a difference between the first location and the second location, and estimating the relative motion based at least in part on the difference. For example, estimating the relative motion of the first sensor may be performed by a sensor processor, such as an image processor configured to identify markers in image data and estimate motion based on changes of location of the markers.

At 608, the example process 600 may include creating data based at least in part on the relative motion estimation and the sensor signals from the first sensor. For example, a sensor processor such as an image processor may calculate, based at least in part on sensor signals representative of an environment surrounding a vehicle and the relative motion of the first sensor, at least one of a position of objects in the surrounding environment, movement of the objects in the surrounding environment, a position of the vehicle, an orientation of the vehicle, or a velocity of the vehicle.

In some examples, at least some portions of the process 600 may be repeated, for example, by returning 602 after 608.

At 610, the example process 600 may also include providing the calculated information to a vehicle controller, and at 612, the vehicle controller, based at least in part on the calculated information, may generate control commands for controlling maneuvering of the vehicle. For example, the calculated information may be at least one of a position of objects in the surrounding environment, movement of the objects in the surrounding environment, position of the vehicle, orientation of the vehicle, or velocity of the vehicle. In some examples, the vehicle may be a UAV, and the vehicle controller may generate control commands based on at least a portion of the calculated information and provide the control commands to a propulsion controller and/or flight control surfaces of the UAV to maneuver and navigate the UAV along a flight path to a destination.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first sensor configured to be coupled to a vehicle and generate one or more first sensor signals representative of an environment;
a second sensor configured to be coupled to the vehicle and generate one or more second sensor signals representative of movement of the first sensor relative to a portion of the vehicle;
a sensor processor in communication with the first sensor and the second sensor, wherein the sensor processor is configured to:
receive the one or more second sensor signals representative of the movement of the first sensor and estimate relative motion of the first sensor relative to the portion of the vehicle;
receive the one or more first sensor signals representative of the environment; and
calculate, based at least in part on the one or more first sensor signals representative of the environment and the relative motion of the first sensor, at least one of a position of one or more objects in the environment or movement of the one or more objects in the environment;
one or more processors; and
memory to store a vehicle controller, the vehicle controller being executable by the one or more processors to control operation of the vehicle based at least in part on at least one of the position of the one or more objects in the environment or the movement of the one or more objects in the environment.

2. The system as recited in claim 1, wherein the system is implemented on an unmanned aerial vehicle (UAV).

3. The system as recited in claim 1, wherein the second sensor comprises an imager configured to capture an image frame sequence associated with the movement of the first sensor relative to the portion of the vehicle, and wherein the image frame sequence comprises a plurality of image frames.

4. The system as recited in claim 3, wherein the sensor processor comprises an image processor in communication with the imager and configured to receive image data representative of the image frames and estimate the relative motion of the first sensor based at least in part on two or more image frames of the image frame sequence.

5. The system as recited in claim 4, wherein the image processor is configured to identify a marker associated with the first sensor in a first image frame of the image frame sequence, identify the marker in a second image frame of the image frame sequence, and estimate the relative motion of the first sensor based at least in part on a first location of the marker in the first image frame and a second location of the marker in the second image frame.

6. The system as recited in claim 5, wherein the image processor is configured estimate the relative motion of the first sensor based at least in part on a difference between the first location and the second location.

7. A method comprising:
receiving one or more first sensor signals from a first sensor;
receiving one or more second sensor signals from a second sensor, the one or more second sensor signals representative of a location of the first sensor relative to the second sensor;
calculating relative motion of the first sensor relative to the second sensor based at least in part on the one or more second sensor signals received from the second sensor; and
creating data based at least in part on the relative motion of the first sensor and the one or more first sensor signals from the first sensor, the data related to at least one of a position of the first sensor or an orientation of the first sensor;
controlling a vehicle based at least in part on the data; and
determining, based at least in part on the data, at least one of a position of one or more objects in an environment associated with the vehicle or movement of the one or more objects in the environment.

8. The method as recited in claim 7, wherein the second sensor comprises an imager, and receiving the one or more second sensor signals from the second sensor comprises capturing an image frame sequence comprising a plurality of image frames representative of the location of the first sensor relative to the second sensor.

9. The method as recited in claim 8, wherein calculating the relative motion of the first sensor comprises calculating the relative motion of the first sensor based at least in part on two or more image frames of the image frame sequence.

10. The method as recited in claim 9, wherein calculating the relative motion of the first sensor comprises:
identifying a marker associated with the first sensor in a first image frame of the image frame sequence; and
identifying the marker in a second image frame of the image frame sequence, wherein calculating the relative motion of the first sensor is based at least in part on a first location of the marker in the first image frame and a second location of the marker in the second image frame.

11. The method as recited in claim 10, wherein the marker comprises a light signal associated with the first sensor.

12. The method as recited in claim 10, wherein calculating the relative motion of the first sensor comprises determining a difference between the first location and the second location, and calculating the relative motion based at least in part on the difference.

13. A vehicle comprising:
a propulsion system coupled to the vehicle to cause movement of the vehicle;
a first sensor coupled to the vehicle and configured to generate one or more first sensor signals representative of an environment;

a second sensor coupled to the vehicle and configured to generate one or more second sensor signals representative of movement of the first sensor;

a sensor processor in communication with the first sensor and the second sensor, wherein the sensor processor is configured to:

receive the one or more second sensor signals representative of the movement of the first sensor and estimate relative motion of the first sensor relative to the vehicle;

receive the one or more first sensor signals representative of the environment; and calculate, based at least in part on the one or more first sensor signals and the relative motion of the first sensor, at least one of a position of one or more objects in the environment or movement of the one or more objects in the environment; and a vehicle controller in communication with the sensor processor and configured to control operation of the vehicle based at least in part on at least one of the position of the one or more objects in the environment or the movement of the one or more objects in the environment.

14. The vehicle as recited in claim 13, wherein the second sensor comprises an imager configured to capture an image frame sequence associated with the movement of the first sensor, and wherein the image frame sequence comprises a plurality of image frames.

15. The vehicle as recited in claim 14, wherein the sensor processor comprises an image processor in communication with the imager and configured to receive image data representative of the image frames and estimate the relative motion of the first sensor based at least in part on two or more image frames of the image frame sequence.

16. The vehicle as recited in claim 15, wherein the image processor is configured to identify a marker associated with the first sensor in a first image frame of the image frame sequence, identify the marker in a second image frame of the image frame sequence, and estimate the relative motion of the first sensor based at least in part on a first location of the marker in the first image frame and a second location of the marker in the second image frame.

17. The vehicle as recited in claim 16, the image processor is configured to estimate the relative motion of the first sensor based at least in part on a difference between the first location and the second location.

18. The system as recited in claim 1, wherein calculating the position of the one or more objects in the environment comprises at least one of:

determining a first distance between a first sensor location of the first sensor and an object of the one or more objects; or determining a second distance between a second sensor location of the second sensor and the object.

19. The system as recited in claim 1, wherein the sensor processor is further configured to determine at least one of a second position of the vehicle, an orientation of the vehicle, or a velocity of the vehicle based at least in part on at least one of the position of one or more objects in the environment or the movement of the one or more objects in the environment.

20. The system as recited in claim 19, wherein the sensor processor is further configured to determine an accuracy of at least one of the second position of the vehicle, the orientation of the vehicle, or the velocity of the vehicle based at least in part on at least one of the position of one or more objects in the environment or the movement of the one or more objects in the environment.

* * * * *